United States Patent Office 3,339,571
Patented Sept. 5, 1967

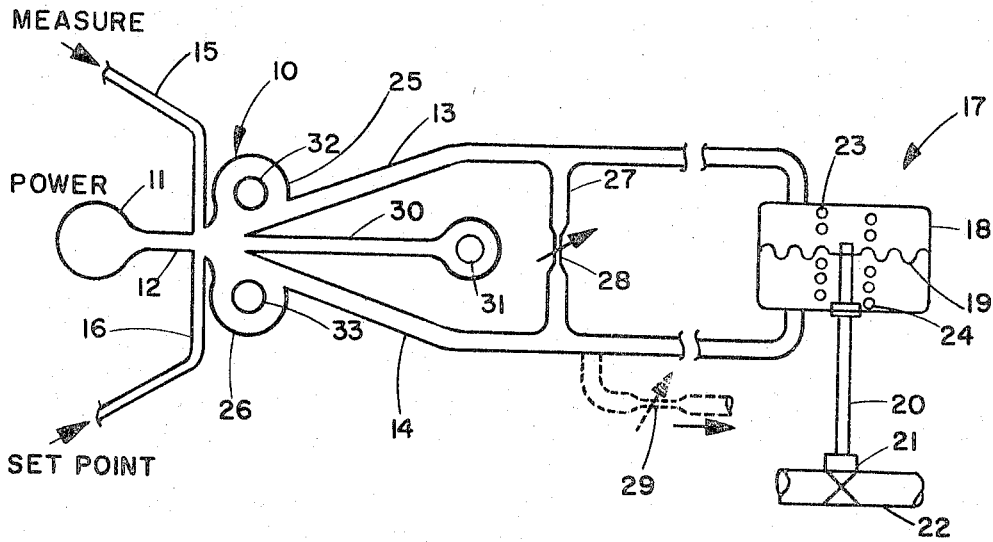
FIGURE I
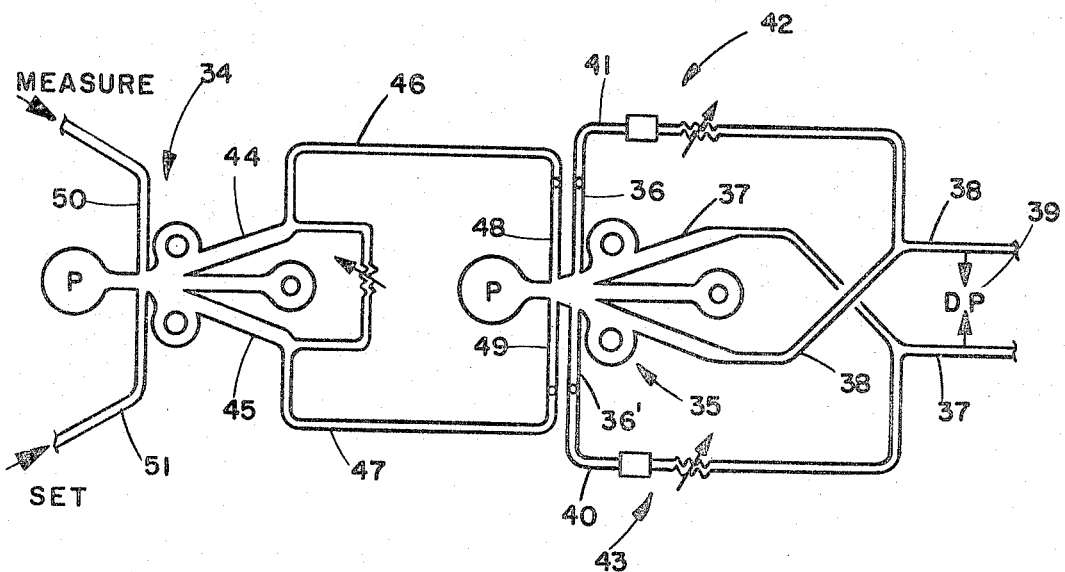
FIGURE II

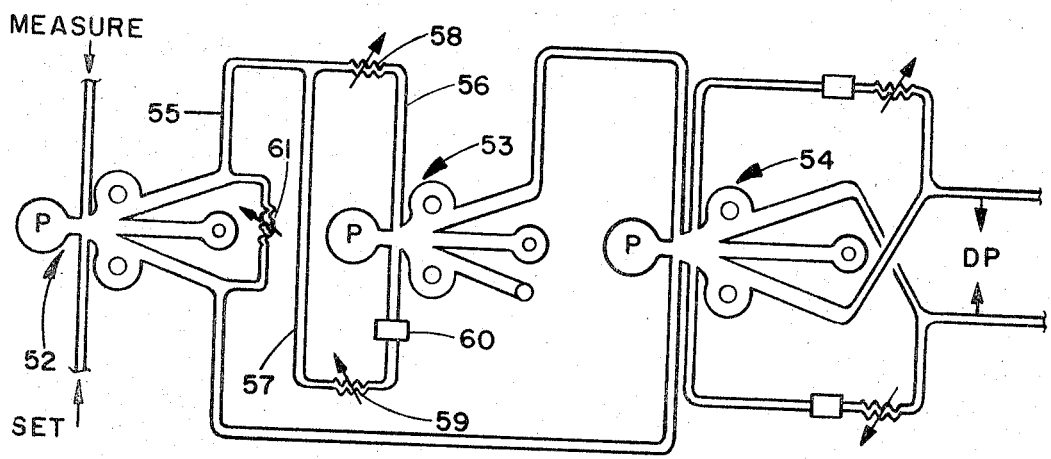
FIGURE III
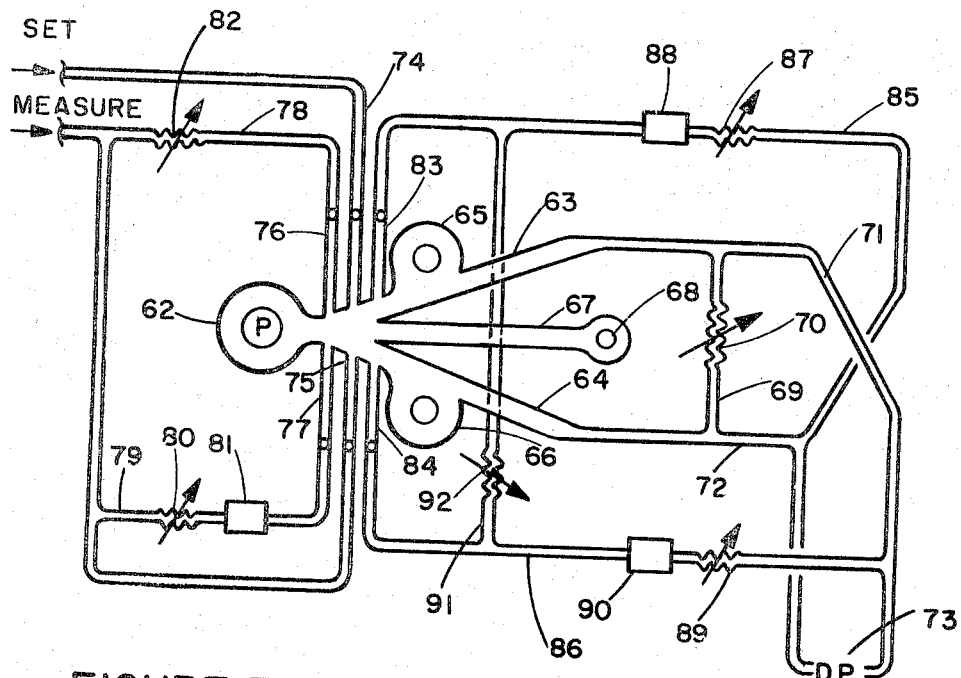
FIGURE IV

3,339,571
FLUID AMPLIFIER ANALOG CONTROLLER
Richard W. Hatch, Jr., Norwell, Mass., assignor to The Foxboro Company, Foxboro, Mass., a corporation of Massachusetts
Filed June 24, 1964, Ser. No. 377,653
1 Claim. (Cl. 137—81.5)

This invention relates to industrial instrumentation for the control of process variables, and specifically provides an analog controller incorporating fluid amplifier means.

It provides a fluid amplifier means and concept of simultaneous and opposing effect controls on a fluid amplifier unit, for example, a variable condition measurement signal versus a set point signal on an analog basis.

In accordance with this invention fluid amplifier controllers are provided as a proportional controller, a proportional plus reset controller, or a proportional plus reset plus derivative controller. These controllers are dynamic, and based on power in terms of flow and pressure.

Recent developments in the field of fluid dynamics have shown new methods of handling information, amplifying signals, and performing control functions without the use of electronics or moving parts.

A new class of solid-state elements, which operate by the flow and interacting flow of fluid jets, has recently been developed. These devices have been generally called fluid amplifiers. They are operated with pulses and frequencies, as well as steady signals. These elements and their systems have some excellent performance characteristics, such as high immunity to both temperature and radiation effects.

There are two general families of elements, digital and analog, and in each of these groups are various classes and types of elements. All elements and systems described are powered and controlled by fluids usually air. All circuits, channels, jets, control ports, etc. may be considered two-dimensional; the element functions are achieved by varying two dimensions.

An important factor associated with solid-state fluid systems is that they are dynamic. There must be a power flow to carry information, and a flow of power is required to initiate control. This immediately indicates certain general parameters and limitations. Signal passage time is limited by the appropriate sound velocity and modulated by conventional resistance and capacity functions. However, if a given device is sensitive to sound, it can be activated at a speed which disregards capacities. In this case a sonic shock-wave can pass through the capacity long before the capacity fills to a normal pressure triggering level. In all fluid systems, however, the final limiting factor is the speed of sound in the given medium.

Gain of these elements is a function of geometric design, as are all other performance characteristics. Power, flow and pressure gain are not maximized simultaneously.

Power requirements for these devices are a direct function of differential pressure, channel size and nozzle dimensions.

There are thus new fundamental measurements in temperature, flow, and pressure. These can lead to simplified solid-state analog control with conventional proportional, integral, and rate functions. Since most industrial process valves are air operated, these systems eliminate the necessity to transduce from controller to valve.

In the area of logic systems, the low cost of these systems and their environmental ruggedness indicates uses in low speed computation, and machine and batch process programming.

It is an object of this invention to provide a new and useful variable condition analog controller, based on fluid amplifier operation.

Other objects and advantages of this invention will be in part apparent and in part pointed out hereinafter and in the accompanying drawings, wherein:

FIGURE I is a schematic illustration of a proportional fluid amplifier controller according to this invention;

FIGURE II is a schematic illustration of a proportional plus reset (integral) controller according to this invention, with two fluid amplifier units;

FIGURE III is a schematic illustration of a proportional, reset, and derivative controller according to this invention, with three fluid amplifier units; and FIGURE IV is a schematic illustration of a proportional, reset, and derivative controller according to this invention, combined to use a single fluid amplifier unit.

In the FIGURE I illustration there is provided an analog controller which operates on a proportional basis with respect to a set point. This controller is provided with a fluid amplifier unit 10 wherein the main power stream is applied from a source 11, through a lead-in passage 12 to a fluid amplifier bifurcation, resulting in a Y configuration of a pair of output passages 13 and 14.

In the usual location and somewhat upstream of the junction of passages 13 and 14, opposing control passages are provided. On the one side there is a measurement signal input passage 15 and on the other a set point input passage 16.

At the right of FIGURE I there is illustrated at 17 a differential diaphragm type of valve motor. It is shown with a housing 18 divided centrally and horizontally by a flexible diaphragm 19. The upper end of a shaft 20 is attached to the diaphragm 19 and downwardly in sealed relation with, and then outward of the valve motor housing 18. This action operates a valve 21 in a flow pipe 22 in accordance with the up and down movement of the flexible diaphragm 19. The diaphragm 19 is opposingly supported on its upper and lower sides by load springs 23 and 24.

Accordingly a proportional differential pressure is applied to the valve motor 17. The opposing pressures on opposing sides of the diaphragm 19 result in movement of the diaphragm vertically with consequent movement of the shaft 20 and adjustment of the valve 21.

In this FIGURE I structure a measurement signal may be taken from an extension of the pipeline 22 or other desired measurement signal. A fluid signal is thus applied to the fluid amplifier 10 through the measurement input 15, and this effect is balanced against a predetermined established set point signal as applied to the fluid amplifier through the input 16.

For example, as measurement increase reaches the value of the set point, the flow in the amplifier unit is balanced between passage 13 and passage 14. Then as these pressures from passages 13 and 14 are applied, through continuations of these passages, to the valve motor 17 on opposite sides of the diaphragm 19, the resulting action in the valve 21 causes a change in the process. This results in measurement signal change in the passage 15 to, for example, reduce it so that now the set point signal is greater. This action correspondingly and proportionally moves the power flow back from passage 14 to passage 13. This back and forth action on a proportional, analog basis with respect to the set point, provides a control of the process in terms of a measurement signal with reference to a set point signal. Thus in control situations where proportional control is desirable, the control system of FIGURE I may be utilized with the fluid amplifier operation as indicated.

The proportional function is established by the configurations of the walls of the passages 13 and 14 such that there is no bi-stable snap over action of the fluid from one passage to another according to the controlling signals. Outer, side wall recesses 25 and 26 prevent wall holding actions and thus make the proportional action possible. Because of these recesses the flow, when moved to a particular passage, does not cling to the wall as it does in the bi-stable flip flop type of fluid amplifier. Thus, the set point versus measure balance as between fluid signals in the passages 15 and 16 is back and forth on a proportional basis in terms of a differential between the set point and the measurement signals.

In the proportional fluid amplifier there is provided, between the outlet passages 13 and 14, a transverse passage 27 with an adjustable restrictor therein as at 28. This provides an adjustment of the proportion desired in accordance with the needs of a particular application.

In the control systems of this invention an opposed pressure diaphragm valve motor is shown. However, these systems are adaptable to a single-sided valve motor, if desired, simply by applying one output to the valve motor and the other output to a vent or pressure sink through a restrictor, as shown in dotted lines at 29.

The fluid amplifier 10 is provided with waste and bleed vents. A central output leg 30 of the amplifier terminates in a vent opening 31, and the side wall clearance recesses 25 and 26 are provided respectively with relatively large waste openings 32 and 33.

FIGURE II shows the structure of FIGURE I in combination with, in a series arrangement, an integral or reset arrangement to provide a fluid amplifier proportional plus reset control system.

The proportioning unit is indicated at 34 and the reset unit is indicated at 35. There are two fluid amplifying units like that of FIGURE I in series, with the second unit at 35 having an additional pair of side control input passages at 36 and 36'. These are positive feedback signal inputs in the reset function of the unit 35. The structures and connections of the proportion unit 34 are like those in FIGURE I.

In the reset unit 35 the output is through output passages 37 and 38 leading to a differential pressure output 39 which may be applied as indicated in FIGURE I either to a differential pressure diaphragm or to a one-sided valve, one side going to the valve and the other side going through a bleed to a vent according to the description of FIGURE I.

In the reset unit 35 there are control feedbacks from the output passages 37 and 38 as indicated at 40 and 41 respectively. These are positive feedback passages leading to control inlets 36 and 36'. They each have a resistance-capacity series arrangement as at 42 and 43 to provide a feedback rate function for the delay necessary to the reset function.

The output passages of the proportional unit 34 are indicated at 44 and 45 and these are connected respectively by passages 46 and 47 to the initial control inputs 48 and 49 of the reset fluid amplifier 35.

The initial fluid amplifier unit 34 has a measurement input at 50 and a set point input at 51. The measurement is affected by the operation of the differential pressure output 39 of the overall device, through a process or an associated process or function as desired.

Accordingly, with respect to the proportional unit 34, when there is a sustained measurement signal in a substantial departure from the set point this difference is expressed in proportional relation between the outputs 44 and 45 of the unit 34. This proportional output is applied to the inputs 48 and 49 of the reset unit 35 to provide in turn a proportioned output between the reset outputs 37 and 38. The result is a differential pressure at 39. Further, these outputs feed signals back through the positive feedbacks 40 and 41 to the positive feedback inputs 36 and 36' and their delay units 42 and 43.

Thus, as the differential pressure output of the overall device has an effect on the process and feeds back directly or through association to vary the input measurement to the proportional unit 34.

The reset feedbacks 40 and 41 provide positive signals in aid of the initial proportional signals in control inputs 48 and 49 to operate the fluid unit 35 in like manner to the action of the initial proportional signals, and in the same proportion. As the process changes through this signal application and the initial incoming signals come to match up the initial measurement and set point signals in the unit 34, then the signals are applied to the inputs 48 and 49 of the reset unit 35 gradually become balanced and equal, and no longer have an effect on the division of the flow in the reset unit 35.

The reset feedback signals through passages 40 and 41 are still in effect and have a proportioning effect on the outputs 37 and 38. This is different and less than it is when the inputs 49 and 48 had different signals. Nevertheless, it is a calculated and predetermined proportioned output on a reduced basis, and this output is locked up. Even though the initial signals in inputs 48 and 49 of the reset unit 35 are removed, the reset feedbacks at 36 and 36' remain and the output of the unit 35 is maintained to give the reset action to the overall device.

After the reset action, the same measurement at 50 provides a different differential pressure in the overall output at 39. In terms of a valve, the valve is in a new position and the same measurement meeting the same setpoint establishes the valve in that new position to take care of the different process condition according to the reset correction.

The FIGURE II system therefore provides a proportional plus reset action in a fluid amplifier device which has no moving parts, is simple, compact, and precise.

In the proportional unit 34 there is provided the usual proportional side wall recess non-clinging formation to make it a proportional device. There are also vent and waste arrangements in these recesses, and in a third central leg of the amplifier in the same manner as in FIGURE I.

Also, in the reset unit 35, the feedback passages 40 and 41 have their resistance function variable and adjustable so that the delay function may be adjusted to a balance between the two feedbacks. They can be made unequal as desired to provide a lopsided response which is useful in some applications. The reset function is on a one-to-one amplification.

The power supplies for both the proportional unit 34 and the reset unit 35 are common. The power comes from the common source under common conditions.

FIGURE II is a two-term controller using solid state analog fluid amplifiers. In three-term control system of FIGURE III, there is a series arrangement of three separate fluid amplifier units as at 52 for proportional function, 53 for derivative function, and 54 for reset function.

The output of the FIGURE III proportional unit 52 is connected to the input controls of derivative function unit 53 and across the reset unit 54. The derivative function in the second fluid amplifier as indicated at 53, is established in one side of the connection from the proportional amplifier 52 to the reset amplifier 54.

The output passage 55 from the proportional amplifier 52 includes the derivative unit. The derivative unit includes the amplifier unit 53 and a control system. The control system stems from a single source comprising the output passage 55 from the proportional unit 52. Two passages are provided, one at 56, and one at 57, from this single source. These are parallel and are applied as opposing control inputs to the derivative amplifier 53. The side 56 of this parallel arrangement is provided with an adjustable restrictor 58 and the other side 57 is provided with the derivative delay combination of a restrictor 59 and a capacity 60, in series.

In this manner, a derivative rate function is provided, since an initial strong signal will be quickly applied to the amplifier 53 through the passage 56 and then will be tapered off in its effect by a signal through the parallel passage 57 according to its action through the derivative delay combination of restrictor 59 and capacity 60. Thus after a passage of time, the signals across the input of the derivative unit 53 will become balanced and the derivative function is terminated.

The reset function is the same as that described in connection with FIGURE II, with the same structures.

FIGURE III therefore provides from a common source indicated at P in each case power for the main fluid flow for each of the amplifier units 52, 53 and 54. The proportional amplifier at 52 has proportional adjustment means thereacross as at 61 and each of the amplifiers have the structure shown previously in the drawings in the form of side wall recesses to prevent wall clinging and to permit proportional function. Further, each amplifier has suitable waste and exhaust passages as indicated in previous drawings both in the side wall recesses and in the central passage between the two main output passages of each amplifier. In the derivative section 53 the restrictor 59 is adjustable to vary the resistance-capacity situation and the restrictor 58 is adjustable to balance out the power system.

The FIGURE IV three term controller system provides proportional, reset, and derivative function using a single fluid amplifier with multiple control.

A power source 62 supplies the main fluid stream for the amplifier, extending into output passages 63 and 64 which branch off from the main passage of the amplifier. As in the other systems in this invention, the outer side walls of these passages are recessed as at 65 and 66 to provide non-clinging side walls and exhaust passages.

This FIGURE IV system also has a central passage 67 with a vent 68 therein for exhausting portions of the fluid stream as needed. As a proportional device the output from the passages 63 and 64 is provided with a cross passage 69 and a variable restrictor 70 therein for adjustment of the proportional situation of the amplifier.

The passages 63 and 64 extending through outputs 71 and 72 provide a differential pressure 73 in representation of the operating output signal of the overall device.

The controls of this FIGURE IV amplifier are established in three pairs. One pair is indicated at 74 and 75, where 75 is a measurement signal and 74 is a set point signal in like manner as those shown in the previous systems herein. A derivative function system is applied by way of input passages 76 and 77. Both derivative inputs are fed from a single measurement source by means of a parallel circuit comprising a passage 78 and a passage 79. The passage 79 has therein a restrictor 80 and capacity 81 in a series arrangement providing a rate function. The parallel passage 78 is provided with a variable restrictor 82 for balancing purposes.

The derivative function is provided as essentially instantaneous application of a signal to the input control 76 and then a tapering off balancing action from that same signal as applied to the opposite side at 77 through the delay combination of the restrictor 80 and the capacity 81.

The FIGURE IV final set of control input passages are provided for a reset function through input passages 83 and 84. Fluid signals are applied to these reset passages 83 and 84 from the outputs 71 and 72 on a cross over basis by way of positive feedback passages 85 and 86. Each of these feedback passages has a rate function in the form of a combination of, on the one hand, a restrictor 87 and capacity 88 in series in the passage 85, and on the other hand, in the passage 86, a variable restrictor 89 and a capacity 90 in series.

The reset function is accomplished through these positive feedback formations in the manner and through the means described in connection with the FIGURE II. Thus FIGURE IV presents a compact single fluid amplifier system embodying the three term control functions of proportional, reset, and derivative.

The FIGURE IV structure has feedback gain adjustment means embodied in a passage 91 across the reset feedback input between the passages 85 and 86, with a variable restrictor 92 therein as a feedback gain adjustment.

This gain adjustment may be provided in the systems of FIGURE II and FIGURE III as desired.

In the reset integral system of this device it is important that the positive feedback amplification provided by the fluid amplifier in the reset function should be what may be identified as effectively a one to one amplification. In order to hold the proportionality established by the input signal compared to a set point and other factors in the reset function it is necessary that the feedback balance be not-amplified. The action should be on a one to one basis or something near that according to the needs of the system and the losses according to the flow, and structure. This is accomplished by adjustments of the restrictors 87 and 89 in the feedback passages as it is in the other reset systems in the previous drawings.

This invention therefore provides a new and useful fluid amplifier control system concept involving, proportional reset, and derivative functions as set forth above.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

I claim:

A fluid powered and operated continuous flow three term analog controller, wherein an operating output in the form of a differential pressure is produced in representation of the differential action of a measured value against a set value as applied to a fluid power flow in a fluid logic system incorporating a combination of proportional, reset, and derivative action, said controller comprising, in combination, three fluid amplifiers in an operatively interconnected series combination wherein the first and input amplifier provides proportional function, the second and intermediate amplifier provides derivative function, and the third and output amplifier provides reset function, said proportional amplifier comprising a fluid power flow input, two branching outputs to which said power flow may be selectively directed, a set point control input to one side of said input amplifier, a measurement control input to the other side of said input amplifier, and an adjustable fluid resistance connected across said two branching outputs as a proportional adjustment for said proportional amplifier, said derivative amplifier comprising a fluid power flow input, two branching outputs to which said power flow may be selectively directed, and a pair of opposed control inputs to said derivative amplifier, an operative connection system from one only of said proportional branching outputs, said connection system comprising a single connection from said one of said proportional branching outputs, and a parallel connection from said single connection to provide said opposed control inputs to said derivative amplifier, a fluid resistance in one side of said parallel connection, and a fluid resistance and fluid capacity in the other side of said parallel connection, and said reset amplifier comprising a fluid power flow input, two branching outputs to which said power flow may be selectively directed, a first pair of opposed control inputs to said reset amplifier, an operative connection from an output of said derivative amplifier to one of said first pair of reset control inputs, an operative connection from the output of said proportional amplifier which is not connected to said derivative amplifier to the other of said first pair of reset control inputs, a second pair of opposed control inputs to said reset amplifier, a single cross-over feedback connection from one of said reset outputs to only the one of said second pair of control inputs which is opposite in said reset amplifier to said one of said reset outputs, a single cross-over feedback connection from the other of said reset outputs to only the other of said second pair of control inputs, a fluid resistance and fluid capacity combination in each of said cross-over feedbacks, and a signal output pair in the form of an output connection from each of said branching outputs of said reset amplifier.

References Cited

UNITED STATES PATENTS

| | | | |
|---|---|---|---|
| 3,075,548 | 1/1963 | Horton | 137—81.5 X |
| 3,124,999 | 3/1964 | Woodward | 137—81.5 X |
| 3,155,825 | 11/1964 | Boothe | 235—201 |
| 3,185,166 | 5/1965 | Horton et al. | 137—81.5 |
| 3,201,041 | 8/1965 | Welsh | 137—81.5 X |
| 3,208,448 | 9/1965 | Woodard | 137—81.5 X |
| 3,223,101 | 12/1965 | Bowles | 137—81.5 |
| 3,226,023 | 12/1965 | Horton | 137—81.5 X |
| 3,227,368 | 1/1966 | Jacoby | 235—201 |
| 3,240,220 | 3/1966 | Jones | 137—81.5 |

FOREIGN PATENTS 1,278,781  11/1961  France.

M. CARY NELSON, *Primary Examiner.*

S. SCOTT, *Assistant Examiner.*